(12) United States Patent
Zhou et al.

(10) Patent No.: US 11,860,375 B2
(45) Date of Patent: Jan. 2, 2024

(54) VIRTUAL REALITY DISPLAY DEVICE AND METHOD FOR PRESENTING PICTURE

(71) Applicant: Tencent Technology (Shenzhen) Company Limited, Guangdong (CN)

(72) Inventors: Weibiao Zhou, Guangdong (CN); Ming-Tien Lin, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/144,939

(22) Filed: May 9, 2023

(65) Prior Publication Data

US 2023/0273447 A1 Aug. 31, 2023

Related U.S. Application Data

(63) Continuation of application No. PCT/CN2022/096642, filed on Jun. 1, 2022.

(30) Foreign Application Priority Data

Jun. 18, 2021 (CN) .......................... 202110679823.1

(51) Int. Cl.
| | | |
|---|---|---|
| *G02B 27/00* | (2006.01) | |
| *G06F 3/01* | (2006.01) | |
| *G02B 27/10* | (2006.01) | |
| *G02B 3/14* | (2006.01) | |
| *G02B 26/00* | (2006.01) | |
| *G02B 26/08* | (2006.01) | |

(Continued)

(52) U.S. Cl.
CPC .......... *G02B 27/1066* (2013.01); *G02B 3/14* (2013.01); *G02B 26/004* (2013.01);
(Continued)

(58) Field of Classification Search
CPC .......... G02B 27/1066; G02B 27/0093; G02B 27/144; G02B 26/004; G02B 26/0875;
(Continued)

(56) References Cited

U.S. PATENT DOCUMENTS

| | | | | |
|---|---|---|---|---|
| 10,937,129 B1* | 3/2021 | Fix | .......................... | G06V 40/19 |
| 2018/0239145 A1* | 8/2018 | Lanman | .................. | G06F 3/013 |

(Continued)

FOREIGN PATENT DOCUMENTS

| | | |
|---|---|---|
| CN | 104914575 A | 9/2015 |
| CN | 205103763 U | 3/2016 |

(Continued)

OTHER PUBLICATIONS

International Search Report dated Aug. 16, 2022 in corresponding International (PCT) Application No. PCT/CN2022/096642.

(Continued)

*Primary Examiner* — Ricardo Osorio
(74) *Attorney, Agent, or Firm* — Crowell & Moring LLP

(57) ABSTRACT

The present disclosure relates to a virtual reality display device. The virtual reality display device includes: a main lens, a semi-reflective lens, a first display screen, a second display screen, a zoom assembly and an eye tracking camera. The main lens is arranged in front of the first display screen and perpendicular to a first direction. The semi-reflective lens is arranged between the main lens and the first display screen. The eye tracking camera points to an eyeball position. The second display screen faces the semi-reflective lens, and light emitted from the second display screen is reflected by the semi-reflective lens and then propagates along the first direction. The zoom assembly is arranged on a front side of the second display screen. The second display screen is configured to display an image based on an eyeball focus position detected by the eye tracking camera.

20 Claims, 5 Drawing Sheets

(51) Int. Cl.
    *G02B 27/14*        (2006.01)
    *G06F 1/16*         (2006.01)
(52) U.S. Cl.
    CPC ..... *G02B 26/0875* (2013.01); *G02B 27/0093* (2013.01); *G02B 27/144* (2013.01); *G06F 1/163* (2013.01); *G06F 3/013* (2013.01)
(58) Field of Classification Search
    CPC .............. G02B 3/14; G02B 2027/0127; G02B 2027/0138; G02B 2027/0185; G02B 27/01; G02B 27/0172; G02B 27/0101; G06F 1/163; G06F 3/013; G06F 3/011; G06F 3/04842; A63F 13/00
    See application file for complete search history.

(56) References Cited

U.S. PATENT DOCUMENTS

2019/0317320 A1* 10/2019 Park ...................... G02B 27/144
2022/0028175 A1*  1/2022 Samec ................. G02B 6/0013

FOREIGN PATENT DOCUMENTS

| | | | | | |
|---|---|---|---|---|---|
| CN | 105653227 | A | | 6/2016 | |
| CN | 105929537 | A | | 9/2016 | |
| CN | 107272204 | A | * | 10/2017 | ......... G02B 27/0101 |
| CN | 107272204 | A | | 10/2017 | |
| CN | 108089332 | A | * | 5/2018 | ............. G02B 27/01 |
| CN | 108089332 | A | | 5/2018 | |
| CN | 108124509 | A | | 6/2018 | |
| CN | 109557677 | A | | 4/2019 | |
| CN | 110325895 | A | | 10/2019 | |
| CN | 111948823 | A | | 11/2020 | |
| CN | 108089332 | B | * | 4/2021 | ............. G02B 27/01 |
| CN | 113419350 | A | | 9/2021 | |

OTHER PUBLICATIONS

Chinese Office Action dated Jan. 6, 2022 in corresponding Chinese Patent Application No. 202110679823.1 with English translation.

* cited by examiner

| Visual focusing plane distance | Depth of field coverage (m) |
|---|---|
| 0.5m (2D) | 0.4 to 0.67 |
| 1.0 m (1D) | 0.67 to 2 |
| 1.5 m (0.67D) | 0.85 to 6.0 |
| 2.0 m (0.5D) | 1 to infinity |

VIRTUAL REALITY DISPLAY DEVICE AND METHOD FOR PRESENTING PICTURE

RELATED APPLICATION

This application is a continuation application of PCT Patent Application No. PCT/CN2022/096642, filed on Jun. 1, 2022, which claims priority to Chinese Patent Application No. 202110679823.1, entitled "VIRTUAL REALITY DISPLAY DEVICE, METHOD AND APPARATUS FOR PRESENTING PICTURE, AND STORAGE MEDIUM" filed on Jun. 18, 2021, wherein the content of the above-referenced applications is incorporated herein by reference in its entirety.

FIELD OF THE TECHNOLOGY

This disclosure relates to the technical field of virtual reality, and in particular, to a virtual reality display device, a method for presenting a picture, a storage medium and a program product.

BACKGROUND OF THE DISCLOSURE

With the continuous development of Virtual Reality (VR) technology, to improve the VR experience of a user, a VR display device can adjust realistic content based on eye movements of the user.

In related technologies, the VR reality device is provided with a fixed display screen and an eye tracking camera. When the user uses the VR display device, the VR display device determines a focus position of the user's eyes through the eye tracking camera, and adjusts the definition of the content in the main display screen in real time, to enable the user to have a corresponding visual experience of distant and close views through visual deception.

However, according to the above-mentioned solution, it is only possible to simulate the distant and close views by adjusting the definition of the image content, and only the users' short-term experience can be met. Due to the deviation from natural physiological reactions, it is easy to cause visual fatigue of the user, resulting in poor VR display effect.

SUMMARY

Embodiments of this disclosure provide a virtual reality display device, a method for presenting a picture, a storage medium and a program product, which can improve the simulation effect of a VR device on different stereo image environments, thereby improving the VR display effect. The technical solutions are as follows.

According to one aspect, a virtual reality display device is provided, including: a main lens, a semi-reflective lens, a first display screen, a second display screen, a zoom assembly and an eye tracking camera, where the main lens is arranged in front of the first display screen and perpendicular to a first direction; the first direction is a propagation direction of light emitted from the first display screen;

the semi-reflective lens is arranged between the main lens and the first display screen, and an inclination angle is formed between the semi-reflective lens and the first direction;

the eye tracking camera points to an eyeball position in response to the virtual reality display device being worn;

the second display screen faces the semi-reflective lens, and light emitted from the second display screen is reflected by the semi-reflective lens and then propagates along the first direction;

the zoom assembly is arranged on a front side of the second display screen; the zoom assembly has at least two focal lengths; and the second display screen is configured to display an image based on an eyeball focus position detected by the eye tracking camera, and the zoom assembly is configured to adjust the focal length based on the eyeball focus position.

According to another aspect, a method for presenting a virtual reality picture is provided, the method being executed by the virtual reality display device, and including:

displaying a first image element of a virtual reality scene through a first display screen in the virtual reality display device;

displaying a second image element of the virtual reality scene through a second display screen in the virtual reality display device, upon being zoomed a the zoom assembly of the virtual reality display device and reflected by a semi-reflective lens in the virtual reality display device, the second image element being superimposed with the first image element to present a scene picture of the virtual reality scene; and displaying, in response to a change in an eyeball focus position of a wearer of the virtual reality display device, the second image element that is updated, through the second display screen, upon being zoomed by the zoom assembly and reflected by the semi-reflective lens, the second image element being superimposed with the first image element to present a scene picture of the virtual reality scene, where an imaging position of the second image element and definition of image sub-elements contained in the second image element are related to the eyeball focus position.

According to still another aspect, an apparatus for presenting a virtual reality picture is provided, including a memory operable to store computer-readable instructions and a processor circuitry operable to read the computer-readable instructions. When executing the computer-readable instructions, the processor circuitry is configured to:

display a first image element of a virtual reality scene through a first display screen in a virtual reality display device;

display a second image element of the virtual reality scene through a second display screen in the virtual reality display device, upon being zoomed by the zoom assembly and reflected by the semi-reflective lens in the virtual reality display device, the second image element being superimposed with the first image element to present a scene picture of the virtual reality scene; and display, in response to a change in an eyeball focus position of a wearer of the virtual reality display device, the second image element that is updated, through the second display screen, upon being zoomed by the zoom assembly and reflected by the semi-reflective lens, the second image element being superimposed with the first image element to present a scene picture of the virtual reality scene, wherein an imaging position of the second image element and definition of image sub-elements contained in the second image element are related to the eyeball focus position.

According to yet another aspect, a virtual reality display device is provided, which is the virtual reality display device as described above; the virtual reality display device includes a memory storing at least one computer instruction, and the at least one computer instruction is loaded and executed by a processor in the virtual reality display device to implement the method for presenting a virtual reality picture.

According to another aspect, a computer-readable storage medium is provided, the storage medium storing at least one computer instruction, and the at least one computer instruction being loaded and executed by a processor in the virtual reality display device to implement the method for presenting a virtual reality picture, where the virtual reality display device is the virtual reality display device as described in the foregoing aspect.

According to another aspect, a computer program product or a computer program is provided, the computer program product or the computer program including a computer instruction, and the computer instruction being stored in a computer-readable storage medium. The processor of the virtual reality display device reads the computer instruction from the computer-readable storage medium, and executes the computer instruction, to cause the virtual reality display device to perform the method for presenting a virtual reality picture. The virtual reality display device is the virtual reality display device as described in the foregoing aspect.

In this disclosure, through a semi-reflective lens, a reflection displayed on the second display screen is superimposed on a main optical axis in a bypass manner, and light of at least two focal lengths emitted from the second display screen is zoomed by the zoom assembly. Image elements with different depths of field can be simultaneously displayed at different imaging positions based on the eyeball focus position of the user in combination with an image displayed on the first display screen. Moreover, at different moments, the imaging position of the image displayed on the second display screen can be changed with the eyeball focus position of the user, so that the simulation effect of the VR device on different stereo image environments can be improved, thereby improving the VR display effect.

DESCRIPTION OF EMBODIMENTS

With the continuous development of VR display technology, in order to improve the use experience of a VR display device, the VR display device needs to be as close to people's natural physiological visual habits as much as possible, so as to reduce the physiological discomfort caused by mismatch between the VR display device and the people's natural physiological visual habits in actual use, thereby reducing the motion sickness, visual fatigue and even physiological damage, etc. of the user who uses the VR display device, and finally increasing the use time of users' VR display device, so that the VR display device can better integrate into the user' daily life.

Based on the above-mentioned requirements, subsequent embodiments of this disclosure provide a virtual reality (VR) display device which can provide display of images at a plurality of different imaging positions based on a user's eyeball focus position.

Figure 1:
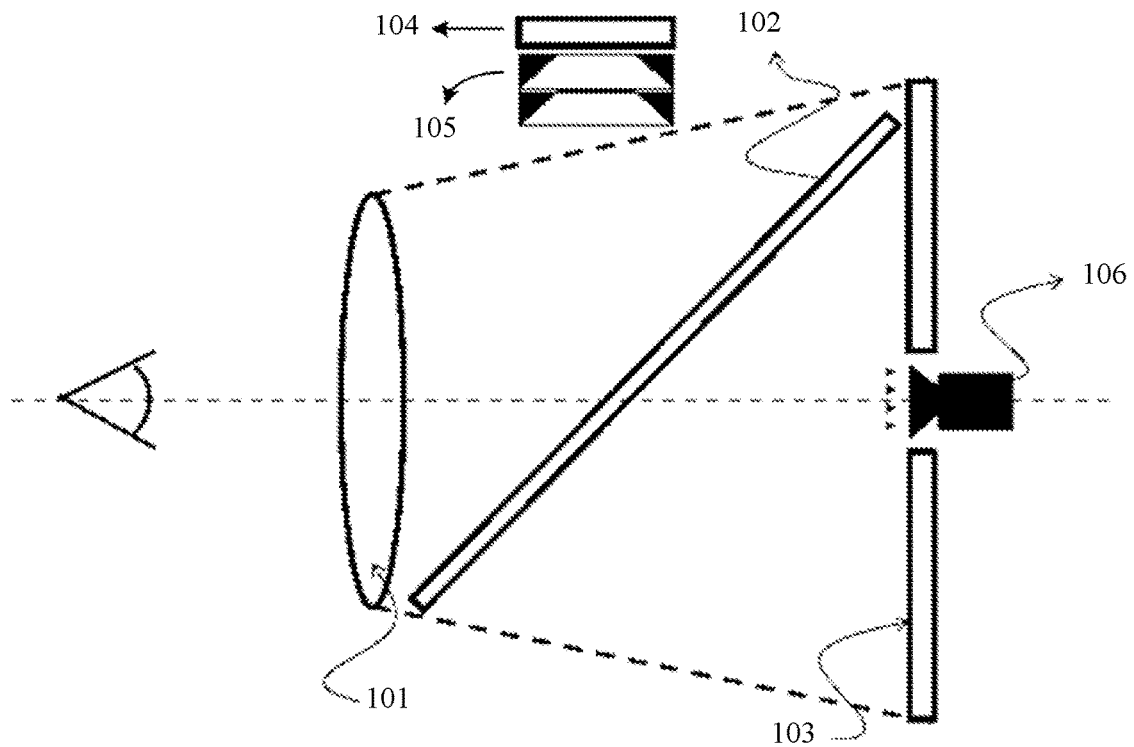
FIG. 1 is a schematic structural diagram of a virtual reality display device according to an exemplary embodiment.

FIG. 1 is a schematic structural diagram of a virtual reality display device according to an exemplary embodiment. As shown in FIG. 1, the virtual reality display device includes: a main lens 101, a semi-reflective lens 102, a first display screen 103, a second display screen 104, a zoom assembly 105, and an eye tracking camera 106.

The main lens 101 is arranged exactly in front of the first display screen 103 and perpendicular to a first direction. The first direction is the propagation direction of the light emitted from the first display screen 103.

The semi-reflective lens 102 is arranged between the main lens 101 and the first display screen 103, and the semi-reflective lens 102 has an inclination angle with the first direction.

The eye tracking camera 106 points to an eyeball position when the virtual reality display device is worn.

The second display screen 104 faces the semi-reflective lens 102, and light emitted from the second display screen 104 is reflected by the semi-reflective lens 102 and then propagates along the first direction.

The zoom assembly 105 is arranged on a front side of the second display screen 104. The zoom assembly 105 has at least two focal lengths.

The second display screen 104 is configured to display images based on the eyeball focus position detected by the eye tracking camera 106, and the zoom assembly 105 is configured to adjust the focal length based on the eyeball focus position.

The eyeball focus position may be a focus position observed by the user's eyes, which may be a depth of field indicating the current focus of the user.

When using the VR display device, the user will observe a virtual environment built by VR, and the purpose of the VR display device is to build a scene that can be close to the real environment as much as possible, and especially in a game scene, the user can enter a scene environment artificially built through the VR display device to experience the experience brought by the game to the user. Generally, in order to improve the game experience and the authenticity of the scene, the user is in a three-dimensional image environment, so the user can easily see a scene including at least three depths of field: long, medium and close.

Figure 2:
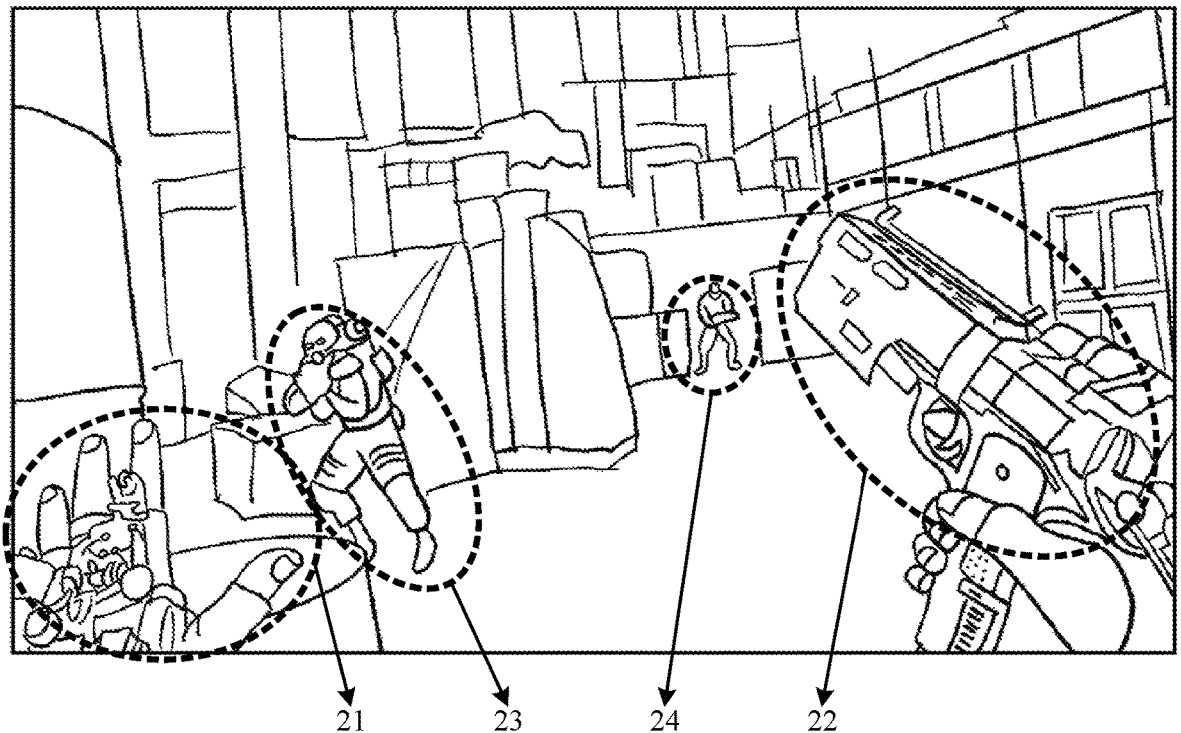
FIG. 2 is a schematic diagram of a VR scene according to the embodiment shown in FIG. 1.

Referring to FIG. 2, FIG. 2 shows a schematic diagram of a VR scene according to an embodiment of this disclosure. As shown in FIG. 2, the close view may be user-centered objects presented with virtual images at about 0.5 m, such as the user's hand 21 and a prop 22 held in the hand in a game, or a console and a desktop in the game. The middle view may be user-centered objects presented with virtual images at about 1-5 m, such as furniture in an indoor environment in a game scene and a close opponent 23. The distant view may be user-centered objects presented with virtual images at 5 m to infinity, such as distant objects in the game scene and a shooting target 24 in a shooting game. For these objects with different depths of field, in real environment, in order to see these objects with different depths of field clearly, the user needs to adjust the relative angle of pupils of both eyes in order to focus on these objects, so as to ensure that these objects can be seen clearly.

Moreover, according to the VR display device shown in the embodiments of this disclosure, the image elements of the middle view can be continuously displayed through the first display screen, and through the cooperation of the second display screen and the zoom assembly, based on the eyeball focus position of the user, at different moments, the image elements with different depths of field can be displayed in high definition at different imaging positions. Therefore, the image elements corresponding to the depths of field can be displayed in higher definition at the imaging position where the user's eyeballs focus at all times, thereby improving the building effect of the three-dimensional VR scene, and also realizing the closeness to the natural physiological visual habits of people, and finally avoiding the problem of physical discomfort to the user.

In conclusion, according to the solutions shown in the embodiments of this disclosure, through a semi-reflective lens, a reflection displayed on the second display screen is superimposed onto a main optical axis in a bypass manner, light of at least two focal lengths emitted from the second display screen is zoomed by the zoom assembly. Image elements with different depths of field can be simultaneously displayed at different imaging positions based on the eyeball focus position of the user in combination with an image displayed on the first display screen. Moreover, at different moments, the imaging position of the image displayed on the second display screen can be changed with the eyeball focus position of the user, so that the simulation effect of the VR device on different stereoscopic image environments can be improved, thereby improving the VR display effect.

Figure 3:
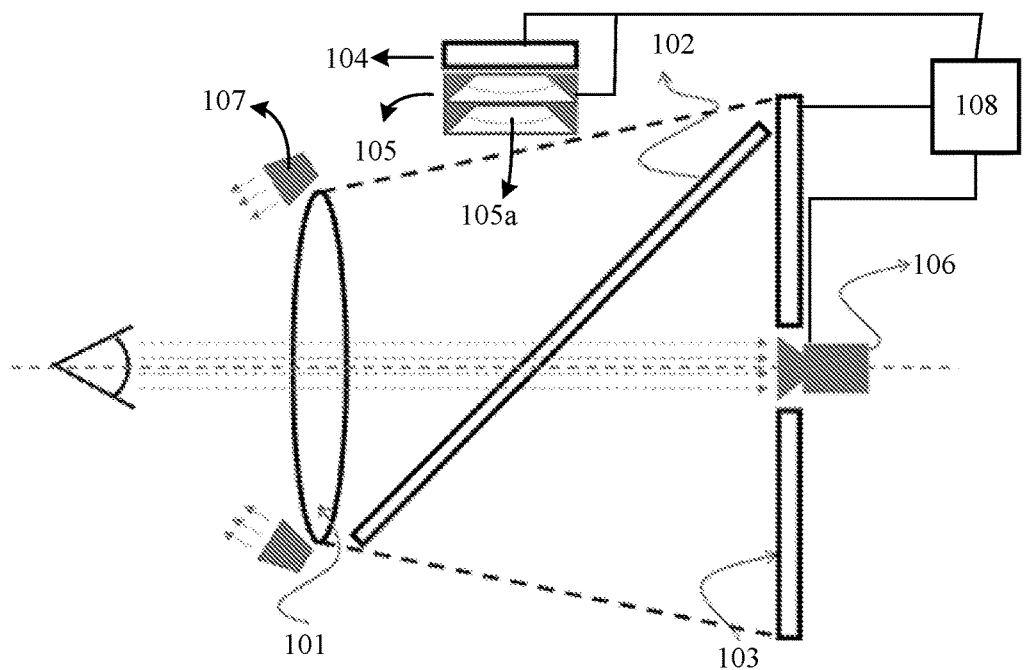
FIG. 3 is a schematic structural diagram of a virtual reality display device according to an exemplary embodiment.

FIG. 3 is a schematic structural diagram of a virtual reality display device according to an exemplary embodiment. As shown in FIG. 3, the virtual reality display device includes: a main lens 101, a semi-reflective lens 102, a first display screen 103, a second display screen 104, a zoom assembly 105, and an eye tracking camera 106.

The main lens 101 is arranged exactly in front of the first display screen 103 and perpendicular to a first direction. The first direction is the propagation direction of the light emitted from the first display screen 103.

The first direction may also be referred to as an extension direction of the main optical axis of the virtual reality display device. Alternatively, the first direction may also be referred to a direction extending from the first display screen 103 to the main lens 101 on the main optical axis of the virtual reality display device.

In the embodiments of this disclosure, the main lens 101 is also referred to as a VR optical lens module. In order to enable the user to see the displayed images clearly and naturally in the VR device, an optical lens system is required in a VR display device. In the solutions shown in this disclosure, the arrangement solution of the main lens 101 may include but is not limited to a single lens solution, a multi-lens group scheme, a resin lens solution, a glass lens solution, an aspherical lens solution, a Fresnel lens solution, a composite lens solution, or the like.

The semi-reflective lens 102 is arranged between the main lens 101 and the first display screen 103, and the semi-reflective lens 102 has an inclination angle with the first direction.

In the embodiments of this disclosure, the semi-reflective lens may also be referred to as a beam splitting mirror or a beam splitter, which is an optical apparatus that splits a beam of light into two or more beams of light, and is usually composed of a metal film or a dielectric film.

The most common shape of the semi-reflective lens is a cube, which is made of two triangular glass prisms, and the two triangular glass prisms are glued together a substrate by using polyester, epoxy resin or polyurethane-based adhesives. By adjusting the thickness of the resin layer, half of the light (of a certain wavelength) incident through a "port" (that is, the face of the cube) is reflected, and the other half continues to propagate due to full internal reflection.

In another design, a semi-reflective lens may also be implemented using a semi-plated silver mirror, a piece of glass or plastic, and a transparent thin metal coating, and the metal coating may be implemented as aluminum vapor deposition aluminum. By controlling the thickness of the deposit, a portion of the light (usually half) incident at a 45-degree angle that is not absorbed by the coating is transmitted, and the rest is reflected. The metal coating may also be replaced by a dichroic optical coating.

In addition, the above semi-reflective lens can also be implemented by means of a dichroic mirror prism assembly, which divides the incident light beam into a plurality of output light beams with different spectra by using the dichroic coating.

The embodiments of this disclosure are not limited in an implementation form of the semi-reflective lens.

In the embodiments of this disclosure, a portion of the light emitted from the first display screen 103 is reflected by the semi-reflective lens 102, and the other portion continues to propagate in the original direction after passing through the semi-reflective lens 102. The portion reflected by the semi-reflective lens 102 propagates to the user's eyes, so as to form, exactly in front of the user's eyes, a virtual image corresponding to the image displayed on the first display screen 103. Therefore, the image displayed on the first display screen 103 can be observed by the user through the main lens 101 and the semi-reflective lens 102.

The eye tracking camera 106 points to an eyeball position when the virtual reality display device is worn.

In an exemplary implementation, the eye tracking camera is arranged in the first display screen.

In the embodiment of this disclosure, in order to collect the eyeball image of the user more accurately, so as to more accurately detect the eye movement, the eye tracking camera can be arranged in the first display screen, so as to collect the eyeball image from the front side of the user's eyes.

In an exemplary implementation, the first display screen includes a hole region, and the eye tracking camera is arranged in the hole region.

or, the eye tracking camera is an under display camera of the first display screen.

In the embodiments of this disclosure, the eye tracking camera may be arranged in the first display screen by forming a hole, that is, the eye tracking camera is arranged in the hole in the first display screen. Alternatively, the eye tracking camera may also be arranged in the first display screen in an under-screen manner, that is, the eye tracking camera collects eyeball images of the user's eyes through the first display screen.

In an exemplary implementation, the eye tracking camera is arranged at a screen center of the first display screen.

In the embodiments of this disclosure, the first display screen 103 is also referred to as a main display screen; the first display screen 103 has two main functions, one is responsible for providing a larger Field of View (FOV) for the VR display device, i.e., an observable angle; generally, the FOV of the main display screen may be greater than or equal to 100° (but not limited to), and the first display screen 103 can be in an operating state under any depth of field state, so as to ensure that the peripheral vision observation region of the user's eyes is synchronized with the display scene, and although it is not necessary to see clearly, it can provide a relatively good and natural visual experience. The other one is responsible for displaying images with medium depth of field. For example, the focus plane of the first display screen 103 can be designed to be near 1D (Diopter) (0.8-1.5D). When the eye tracking camera is placed in the center of the first display screen 103 and the eye tracking camera is arranged in a hole, it is necessary to form a hole in the first display screen 103, similar to the hole forming solution of the front camera of a mobile phone. The first display screen 103 includes, but is not limited to, a thin film transistor liquid crystal display (TFT LCD) and an active-matrix organic light emitting diode (AMOLED), and the like.

In the embodiments of this disclosure, the virtual reality display device further includes a light source 107 used in conjunction with the eye tracking camera 106, and the light source 107 is configured to illuminate the eyeball position when the virtual reality display device is worn.

The light source 107 may be an infrared light source, such as, an infrared LED light source. Accordingly, the eye tracking camera 106 may be a camera for collecting infrared light.

In the eyeball detection solution in an embodiment of this disclosure, an infrared camera can be selected to identify the position of the eyeball pupil by capturing the image of the user's eyeball, and an infrared LED cooperating with the infrared camera illuminates the eyeball in a dark environment used by VR. In the solution shown in the embodiment of this disclosure, the techniques for eye movement recognition include, but are not limited to, pupil corneal reflection method, retinal imaging method, eyeball modeling method, retinal reflected light intensity method, corneal reflected light intensity method and the like.

Pupil corneal reflection method: using a near-infrared light source (such as 880 nm near-infrared light) to emit near-infrared light to the eyes, the near-infrared light being reflected at the corneas of the eyes; then, collecting the images of these eyes with reflection by the infrared camera having a high speed capture function; and identifying the pupils and corneas in the images, and performing eye movement detection through a connection line between the center of cornea and the center of pupil.

Retinal imaging method: identifying the patterns formed by physiological structures such as irregular capillaries and fovea on the retina, and performing eye movement detection by calculating changes in retinal images.

Eyeball modeling method: a method for performing eye movement detection by calculating the center of vision after eye modeling. The method for eye modeling may include modeling the eyes by using structured light, and modeling the eyes by using a light field camera, and the like.

Retinal reflected light intensity method: laser passes through the cornea, pupil and lens to finally irradiate the retina, the retina reflects the incident laser, and then an external photosensitive sensor determines the direction of eyeball movement by detecting the intensity of light reflected from the retina.

Corneal reflected light intensity method: the outer wall of the cornea is relatively smooth, and if a laser beam is emitted to the cornea from one side of the eye, the laser is reflected by the cornea. When the laser just irradiates the center of the cornea (the center of the cornea is the highest point), the reflection intensity of the laser is the largest, and therefore, the direction of eyeball movement can be determined by detecting, through the photosensitive sensor, the intensity of light reflected by the cornea.

The eye tracking camera can pass through the hole in the main display screen. In order to capture eye movement more accurately, the eye tracking camera can be arranged on the main optical axis connecting the pupil center of the eyeball, the optical center of the lens and the display.

In addition, when the main screen is an AMOLED, the first display screen 103 may also has no hole formed therein, and the eye tracking camera may adopt an under display camera solution. In this case, the second display screen 104 and the zoom assembly 105 may only operate in two focal lengths, i.e., covering distant view and close view.

In another possible implementation, the eye tracking camera may also be arranged outside the first display screen 103, for example, on the side of the first display screen 103, so that, after passing through the main lens 101, the light emitted from the user's eyeball position can directly reach the eye tracking camera without passing through the semi-reflective lens 102; or the eye tracking camera may also be arranged on a side surface of the main lens 101, so that the light emitted from the eyeball position of the user directly reaches the eye tracking camera without passing through the main lens 101.

The second display screen 104 faces the semi-reflective lens 102, and light emitted from the second display screen 104 is reflected by the semi-reflective lens 102 and then propagates along the first direction.

The inclination angle may be 45° or close to 45°. For example, the inclination angle may be 40° or 50° according to the installation direction of the second display screen 104, so long as the light emitted from the second display screen 104 can propagate along the first direction after being reflected by the semi-reflective lens 102.

The second display screen 104 includes, but is not limited to, a TFT LCD, an AMOLED, an Organic Light-Emitting Diode (Micro OLED) display screen, and the like. A size and display coverage range of the second display screen 104 may be consistent with or different from those of the first display screen 103, and the FOV of the second display screen 104 in cooperation with the zoom assembly 105 may also be consistent with or different from that of the first display screen 103. In the embodiments of this disclosure, in order to implement the miniaturization and compact structure of the VR display device, in combination with the physiological structural characteristics of human eyes, in the solution shown in this disclosure, a display screen with a relatively small size can be chosen as the second display screen, and a FOV less than that of the main screen can be selected, for example, the FOV of the first display screen 103 covers a range of 110°, and the FOV of the second display screen 104 covers a range of 60°. When focusing on close view images and distant view images at specific points, the user can clearly observe the scenes within a certain conical visual range (for example, FOV<60°).

The semi-reflective lens 102, also called a beam splitting mirror, is an optical assembly configured to split incident light into two different beams at a specified ratio. When the semi-reflective mirror is placed at a certain angle (such as 45°) along the optical axis, the main optical axis of the VR display device is extended laterally to add a channel for the display image of the second display screen without affecting the image displayed on the main display screen. In addition, image superimposition also prevents the user seeing the hole of the eye detection module on the main display screen.

In the embodiments of this disclosure, one part of the light emitted from the second display screen 104 passes through the semi-reflective lens 102 and then continues to propagate in the original direction, and the other part is reflected by the semi-reflective lens 102 and then propagates along the main optical axis direction and passes through the main lens 101. Therefore, the image displayed on the second display screen 104 can also be observed by the user through the main lens 101 and the semi-reflective lens 102.

The zoom assembly 105 is arranged on a front side of the second display screen 104. The zoom assembly 105 has at least two focal lengths.

The second display screen 104 is configured to display images based on the eyeball focus position detected by the eye tracking camera 106, and the zoom assembly 105 is configured to adjust the focal length based on the eyeball focus position.

The eyeball focus position detected by the eye tracking camera 106 may refer to the eyeball focus position obtained by recognizing the eyeball image collected by the eye tracking camera 106.

In the embodiments of this disclosure, the light emitted from the second display screen 104 is first zoomed by the zoom assembly 105, and is then incident on the semi-reflective lens 102. In different focal lengths, after the light is zoomed by the zoom assembly 105 and passes through the semi-reflective lens 102, imaging positions thereof are also different, that is, the distances from the imaging positions to the human eyes are different.

On this basis, by controlling the focal length of the zoom assembly 105 and the content displayed on the second display screen 104 based on the eyeball focus position detected by the eye tracking camera 106, images with different effects can be displayed at different imaging positions (for example, displaying a clear distant view, a clear close view or a clear middle view), and in combination with the image displayed on the first display screen 103, images of multiple imaging positions can be displayed at the same time, and the imaging position of the image displayed on the second display screen 104 may be changed along with the eyeball focus position.

In an exemplary implementation, the zoom assembly 105 is a liquid zoom assembly.

In the embodiments of this disclosure, in order to simplify the mechanical structure so as to be arranged inside a narrow VR display device, the liquid zoom assembly may be used as the zoom assembly 105.

The liquid zoom assembly is also called a liquid lens/liquid lens group, and the principle thereof is to adjust the focal length thereof by changing the surface shape of light-transmitting liquid (such as changing the plane to a concave or convex surface), so that the refraction angle of light passing through liquid changes.

Different from traditional lenses, the liquid lens is an optical element made of one or more liquids without mechanical connection, and internal parameters of the optical element can be changed through external control, so that the optical element has incomparable performance with traditional optical lenses. Simply, the medium of the lens changes from glass to liquid, and more accurately, it is a novel optical element that dynamically adjusts the refractive index of the lens or changes the focal length by changing the surface shape thereof. The material of the optical element is a shape-changeable optical liquid material. The focal length of a glass lens depends on the material and radius of curvature thereof. The liquid lens follows the same basic principle, but it is unique in that the radius of curvature of the liquid can be changed, thereby changing the focal length. For this radius change, an electronic control mode is adopted, which can realize millisecond-level changes.

The liquid zoom assembly has the advantage of small size and can fit into a narrow assembly space.

In an exemplary implementation, the zoom assembly 105 includes a single liquid lens 105a, or the zoom assembly 105 includes at least two liquid lenses 105a stacked together.

In an exemplary implementation, the focal length of the liquid lens 105a is controlled by an on-off state of the liquid lens 105a.

that is, the single liquid lens 105a has two different focal lengths, and the two different focal lengths are controlled by the on/off state of the liquid lens 105a. The on/off state of the single liquid lens 105a may implement two focal lengths. When the zoom assembly 105 includes at least two liquid lenses 105a stacked together, the combination of different on/off states of the at least two liquid lenses 105a may implement a plurality of different focal lengths.

In the embodiments of this disclosure, when the zoom assembly 105 is implemented as a liquid lens group, the liquid lens group may be composed of one or several liquid lens groups, thereby constructing no less than three depth-of-field focal length ranges.

In an exemplary solution of the embodiment of this disclosure, in order to quickly switch the focal length and ensure the consistency of components to reduce the influence of visual difference caused by errors on the overall experience of the device, two liquid lenses can be selected to form a lens group, and each lens selects two states, i.e., on and off, so as to implement three states: on+on, on+off, and off+off, corresponding to three different focal lengths.

In an exemplary implementation, in at least two focal lengths of the zoom assembly, every two adjacent focal lengths partially overlap each other.

In an exemplary implementation, the virtual reality display device further includes a processor 108, and the processor 108 is electrically connected to the first display screen 103, the second display screen 104, the zoom assembly 105, and an eye tracking camera 106, respectively.

The processor 108 may be configured to control the pictures displayed on the first display screen 103 and the second display screen 104, and control the focal length of the zoom assembly 105 according to the eyeball focus position collected by the eye tracking camera 106.

In an exemplary implementation, the first display screen 103 is configured to display an image element in a VR scene at a specified depth of field (such as a middle view) in a viewing angle range of a corresponding scene, and the second display screen 104 is configured to display image elements in the VR scene that are not displayed by the first display screen 103 within the viewing angle range of the corresponding scene, for example, image elements at a close view and a distant view.

When the first display screen 103 is a screen with a hole (the eye tracking camera 106 is arranged in the hole), an image element of a fixed depth of field at a hole position in the first display screen 103 is not displayed either. In order to make up for the defect, when the first display screen 103 is a screen with a hole, the second display screen 104 further displays an image element in the VR scene corresponding to the specified depth of field and located at the hole position.

In the embodiments of this disclosure, in the process of the virtual reality display device running and displaying a VR scene, the processor 108 may obtain an eyeball image collected by the eye tracking camera 106, identify an eyeball focus position of the user, determine, according to the eyeball focus position, a depth of field that the user is currently concerned with, determine a corresponding focal length of the zoom assembly, and determine the display effect of an image element displayed in the second display screen 104. Then, the processor 108 controls the second display screen 104 to display the image element, and controls the zoom assembly to adjust the focal length, so that the image element displayed by the second display screen 104 is presented by using the depth-of-field position that the user is currently concerned with as the imaging position. Since the image element displayed by the second display screen 104 is optimized based on the eyeball focus position of the user, the image content of the depth of field that the user is currently concerned with can be displayed with higher definition, so as to achieve a better image display effect on the premise of being close to the natural physiological visual habits of the user.

Reference is made to descriptions in the subsequent embodiments for the process of the processor 108 controlling the second display screen 104 to display the image element and controlling the zoom assembly to adjust the focal length.

The circuit portion structure of the virtual reality display device may include a central processing unit (CPU), i.e., the processor 108, a system memory including a random access memory (RAM) and a read-only memory (ROM), and a system bus connecting the system memory and the central processing unit. The virtual reality display device further includes a basic input/output system that assists in transmitting information between components within the virtual reality display device, and a mass storage device for storing operating systems, application programs, and other program modules.

The mass storage device is connected to the central processing unit through a mass storage controller (not shown) connected to the system bus. The mass storage device and a computer-readable medium associated therewith provide non-volatile storage for the virtual reality display device. That is, the mass storage device may include a computer-readable medium such as a hard disk or a memory card (not shown).

Without loss of generality, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes RAM, ROM, flash memory or other solid state storage technologies, optical storage, cassettes, magnetic tape, disk storage, or other magnetic storage devices. Certainly, it may be known by a person skilled in the art that the computer storage medium is not limited to the foregoing several types. The system memory and the mass storage device may be collectively referred to as a memory.

The virtual reality display device may be connected to the Internet or other network devices through a network interface unit connected to the system bus.

The memory further includes at least one computer instruction, which is stored in the memory, and the central processing unit implements all or some of the steps of the subsequent method for presenting a virtual reality picture of this disclosure by executing the at least one computer instruction.

In conclusion, according to the solutions shown in the embodiments of this disclosure, through a semi-reflective lens, a reflection displayed on the second display screen is superimposed onto a main optical axis in a bypass manner, light of at least two focal lengths emitted from the second display screen is zoomed by the zoom assembly. Image elements with different depths of field can be simultaneously displayed at different imaging positions based on the eyeball focus position of the user in combination with an image displayed on the first display screen. Moreover, at different moments, the imaging position of the image displayed on the second display screen can be changed with the eyeball focus position of the user, so that the simulation effect of the VR device on different stereoscopic image environments can be improved, thereby improving the VR display effect.

Figure 4:
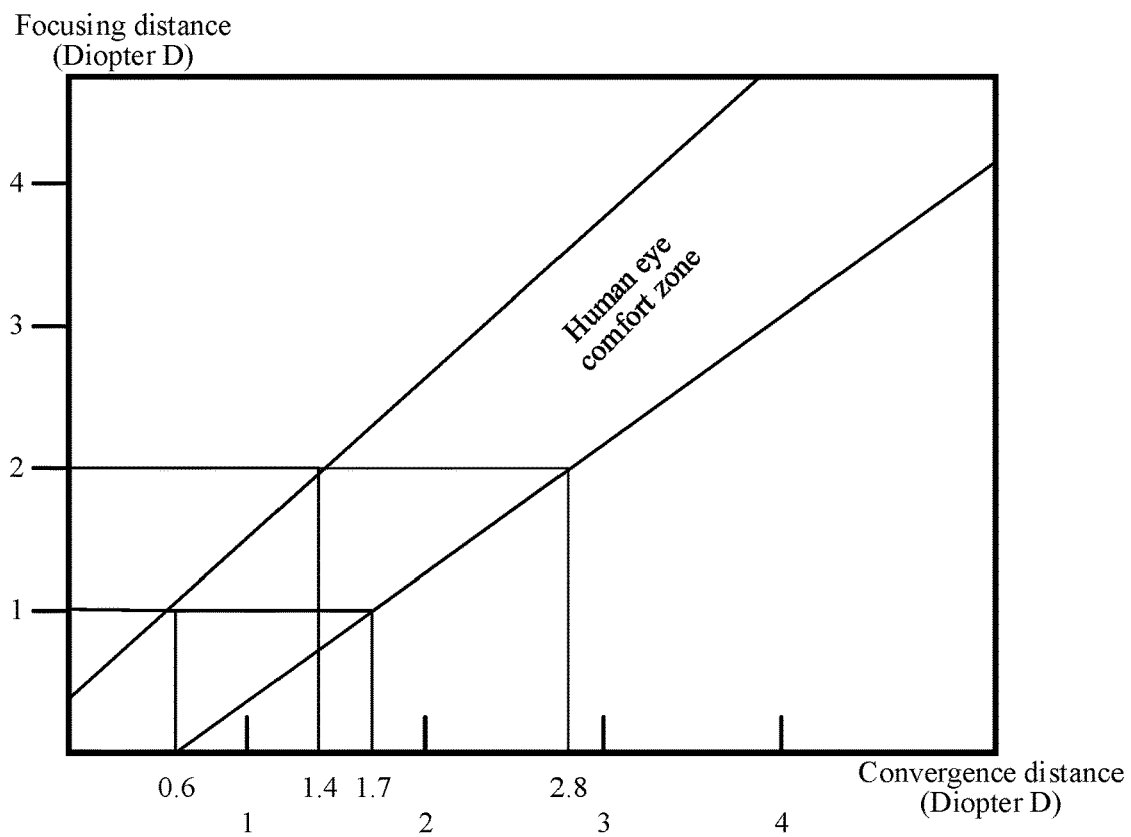
FIG. 4 is a comparison diagram between a focusing distance and a convergence distance according to this disclosure.
Figures 5, 6:
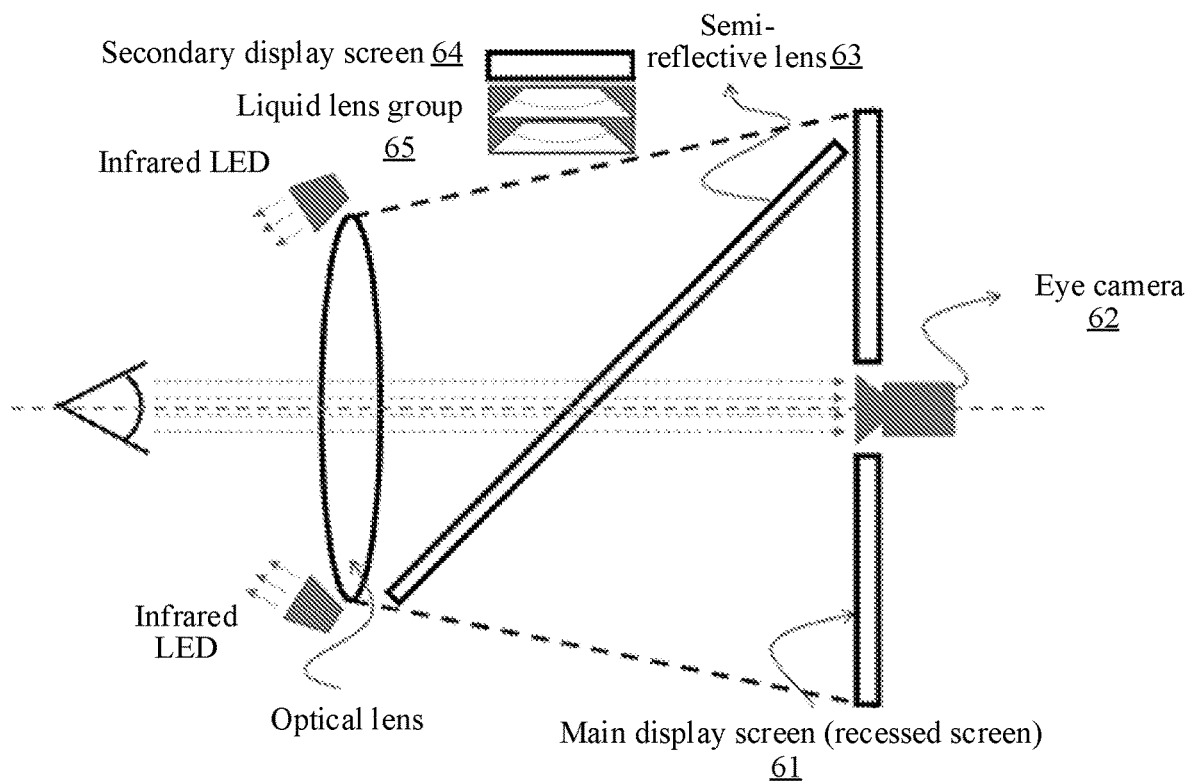
FIG. 5 is a schematic diagram of a visual focusing plane distance and a depth of field coverage according to this disclosure.
FIG. 6 is a schematic structural diagram of a virtual reality display device according to an exemplary embodiment of this disclosure.

According to the solution shown in the embodiments of this disclosure, starting from the study of the natural visual physiological mechanism of the user, under the condition of ensuring that the user has relatively good visual experience, the device is close to the natural visual physiological mechanism of people as much as possible, so as to reduce the visual fatigue of the user, improve the use experience of the VR display device, avoid affecting the long-term use of the device by the user due to fatigue, and avoid destroying the immersion when the user uses the VR display device. Referring to FIG. 4 and FIG. 5, FIG. 4 shows a comparison diagram between a focusing distance and a convergence distance according to this disclosure. FIG. 5 is a schematic diagram of a visual focusing plane distance and a depth of field coverage according to this disclosure. As can be seen from the graphs shown in FIG. 4 and FIG. 5, after a certain optical design, the corresponding focusing plane distance of the display screen of the VR display device may correspond to a distance range that a user can comfortably focus and see clearly, so that the depth-of-field range values corresponding to the visual distances of different focal planes can be obtained.

In the usage scenarios of the VR display device and daily living habits, in normal states, users are more physically accustomed to seeing things that are closer to them more clearly, and will focus most of the time on observing nearby scenery; moreover, the users often make frequent visual switching on the nearby scenery, and collect as much image information of the nearby scenery as possible, so as to make up for the physiological characteristic that the visual nerves around the fovea in the eyeball are gradually decrease. in addition, because objects are continuously distributed along the depth of field in daily scenes, as long as both eyes focus thereon, all the objects can be clearly seen continuously. However, in a VR environment, because one visual focal plane can only correspond to one depth of field range, when an object presented by the VR is not in the depth of field range, a user suddenly fails to see the object clearly, as a result, the immersion of the user is greatly affected and the user in a VR game suffers a great impact. Therefore, according to the foregoing data, a better VR display device is to have a focal plane design with three (or even more) depth of field ranges. 0.5 m (2D) range is responsible for the display of a close view; 0.4-0.67 m (meter, length unit), for the display of images of a game prop, a console and the like. 1.0 m (1D) range is responsible for the display of a middle view; 0.67-2 m, for the display of a scene content in a close environment. 2 m (0.5D) range is responsible for the display of a distant view; 2 m to infinity, for the display of objects far away from the user. Considering that the eye tracking camera may have a detection bias, in order to avoid immersion destruction caused by discontinuous switching between depths of field, in the embodiments of this disclosure, the focal lengths are selected to overlap so as to ensure continuous connection. For example, close-view focal length 2D corresponds to 0.4 m to 0.67 m, close-view focal length 1.2D corresponds to 0.58-1.4 m, and close-view focal length 0.5D corresponds to 1 m to infinity. In this way, among the three focal lengths from 0.4 m to infinity, every two adjacent focal lengths partially overlap each other, and there is a certain overlap margin when switching between focal lengths in the process of focal length switching. In addition, the overlapping design between two adjacent focal lengths can also offset the influence of assembly errors of the VR display device.

Based on the virtual reality display device shown in FIG. 1 or FIG. 3, please refer to FIG. 6, which is a schematic structural diagram of a virtual reality display device according to an exemplary embodiment of this disclosure. As shown in FIG. 6, in the embodiment of this disclosure, a dual-screen design is adopted. In order to better implement eye detection, a main display screen 61 is designed as a screen with a hole (or adopts an under display camera solution) for displaying images in the 1D range. The screen with a hole can ensure that an eye tracking camera 62 can be placed on a main optical axis to ensure the detection of the focus position of the user's eyes to the greatest extent. In addition, a semi-reflective lens 63 (also called a beam splitting mirror/beam splitter) is arranged on the main optical axis to add a bypass optical axis on the main optical axis. On this bypass optical axis, a secondary display screen 64 is placed (the display range of the secondary screen may be different from that of the main screen). In order to make the whole machine design more compact and utilize the physiological characteristics of the eyeball, in the embodiments of this disclosure, the FOV of the main screen is selected to be 100° to 110°, and the FOV of the secondary screen is selected to be about 60° to 70°. A liquid lens group 65 is added in front of the secondary display screen to implement the optical zoom function of no less than three lengths.

Figure 7:
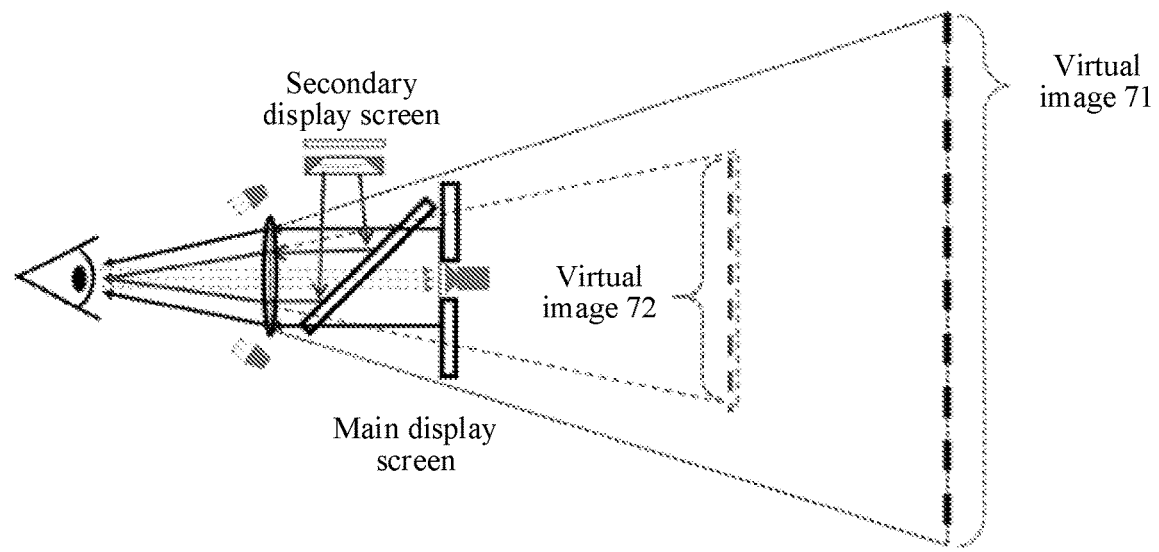
FIG. 7 to FIG. 9 are imaging position diagrams of three focal lengths according to an embodiment of this disclosure.
Figure 8:
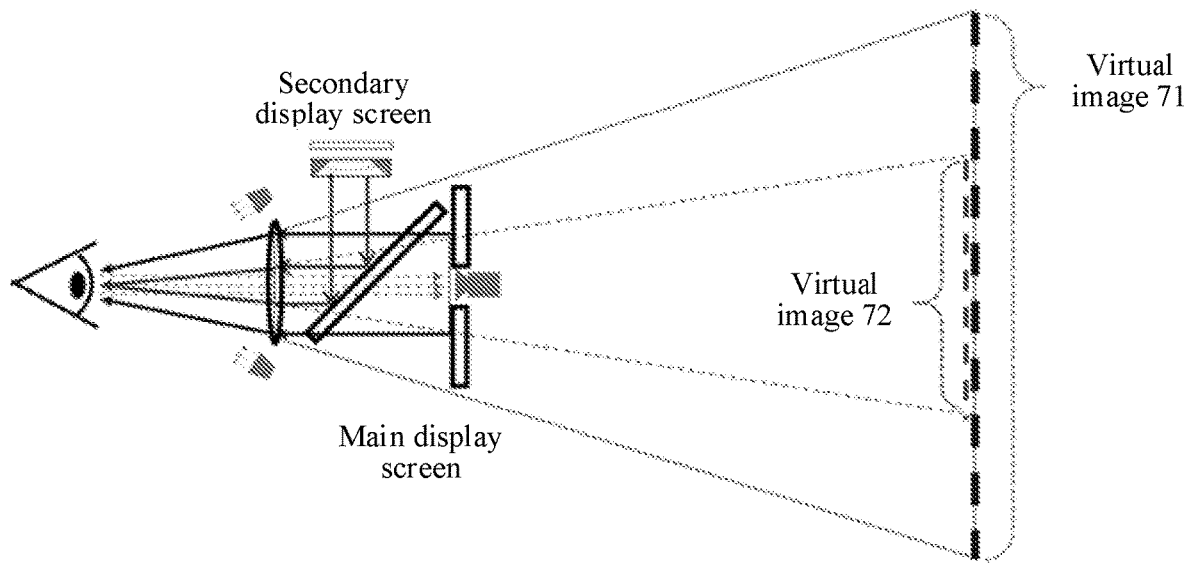
Figure 9:
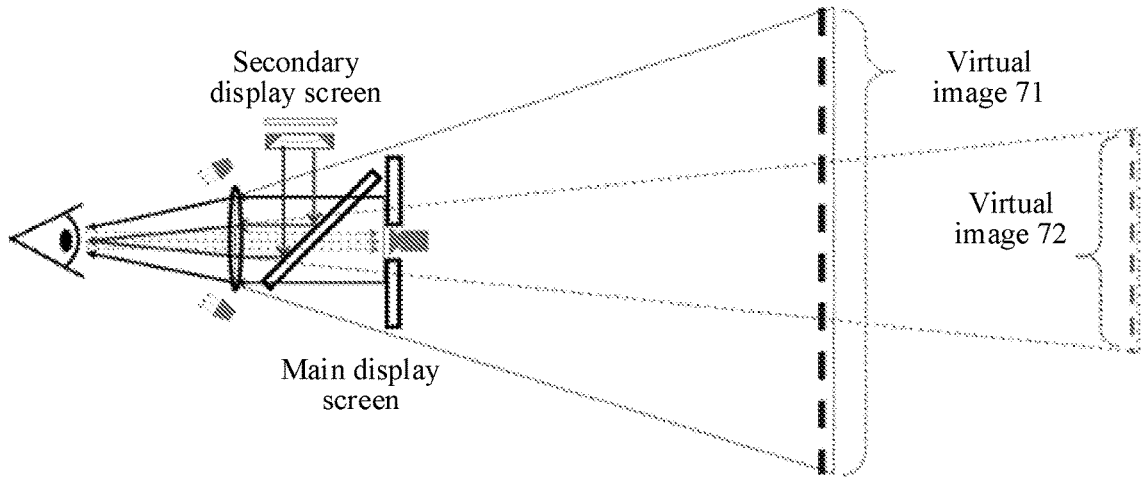

In the embodiments of this disclosure, a solution in which two liquid lenses form a liquid lens group 65 is adopted. In order to make the device more stable, the on and off states of the liquid lens are selected, and the combination of two lenses can simply implement the three combinations, i.e., off+off, on+off and on+on, thereby achieving three focal lengths. Referring to FIG. 7 to FIG. 9, FIG. 7 to FIG. 9 are imaging position diagrams of three focal lengths according to an embodiment of this disclosure.

Referring to FIG. 7 to FIG. 9, the main screen display part is mainly responsible for providing a large FOV and a middle view display part in a normal state. However, due to the use of a screen with a hole, there is an image defect in the center of the screen, so the secondary screen and the liquid lens group re required to complement the defect.

As shown in FIG. 7, the main display screen displays a middle view image, and the medium view image forms a virtual image 71 at a medium view position. When the user's eyes focus inward (focusing inward here may means that the focus position of the user's eyes is inward compared with the position of the virtual image 71, that is, the focus position of the user's eyes is on the left side of the virtual image 71 in FIG. 7) to observe a close view, the liquid lens adjusts the focal length so that the image displayed on the secondary display screen forms a virtual image 72 of the close view image (for example, improving the definition of the close view image elements, and blurring middle view and long view image elements) at a position where the user's eyes focus inward, as a result, the user can comfortably and clearly observe the details of the close view scene in combination with the rotation of the user's pupils.

As shown in FIG. 8, when the user observes a the middle view with both eyes, the position of the virtual image 71 of the middle view image displayed on the main display screen is unchanged, and the liquid lens adjusts the focal length, as a result, the image displayed on the secondary display screen forms a virtual image 72 of the middle view image (for example, improving the definition of the middle view image elements and blurring the distant view and close view image elements) at a position where the user's eyes focus. The virtual image 72 of the middle view image displayed on the secondary display screen is superimposed with the virtual image 71 of the middle view image displayed on the main display screen, so that the user can comfortably and clearly observe the details of the middle view scene in combination with the rotation of the user's pupils.

As shown in FIG. 9, when the user's eyes focus outward (focusing outward here may mean that the focus position of the user's eyes is outward compared with the position of the virtual image 71, that is, the focus position of the user's eyes is on the right side of the virtual image 71 in FIG. 9) to observe a distant view scene, the position of the virtual image 71 of the middle view image displayed on the main display screen is unchanged, and the liquid lens adjusts the focal length, so that the image displayed on the secondary display screen forms a virtual image 72 of the distant view image (for example, improving the definition of the distant view image elements, and blurring the middle view and close view image elements) at the position where the user's eyes focus, as a result, the user can comfortably and clearly observe the details of the distant view scene in combination with the rotation of the user's pupils.

Through the above-mentioned solution, the focusing range of pupils under different depths of field can be adapted, and the natural comfort of eyes can be ensured. As a result, the display quality of the VR display device is improved and the fatigue degree of the user' eyes is further relieved.

That is, through the solution shown in the embodiments of this disclosure, multi-depth of field adaptation of the VR display device can be realized to conform to the physiological characteristics of the eyes, thereby improving the visual experience and reducing the fatigue.

In addition, the eyeball detection system in the VR display device shown in this disclosure can detect the focus position of the user's eyes in real time, and cooperate with the liquid lens to output images based on the corresponding focus length, so as to ensure the definition and continuity of each image.

In addition, the embodiment of this disclosure makes full use of the characteristics of the liquid lens, so that zoom can be achieved quickly, and the risk of device life can be reduced because there is no moving mechanical structure.

Figure 10:
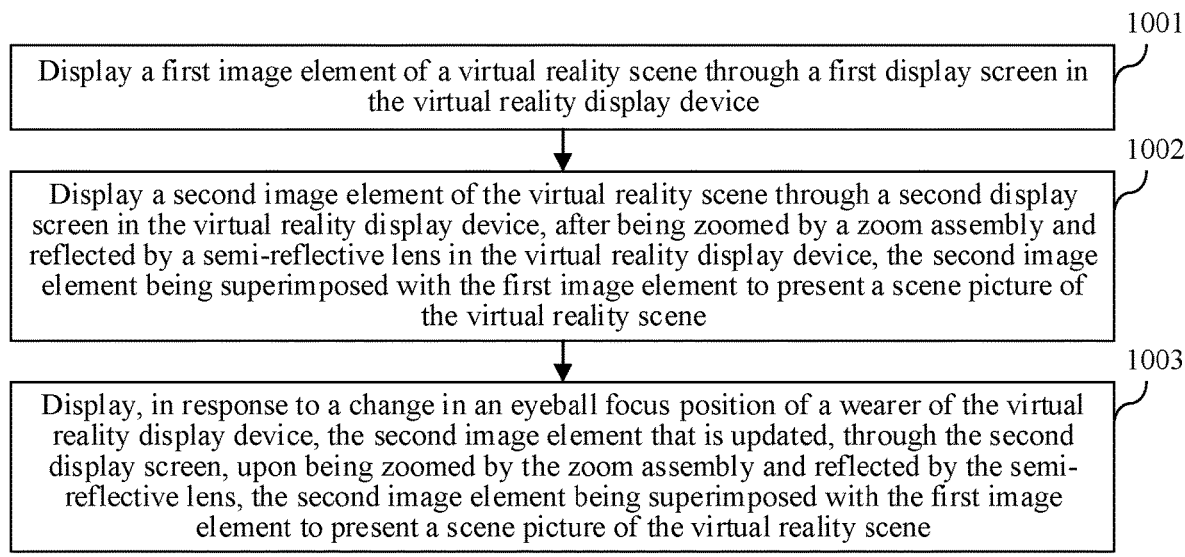
FIG. 10 is a schematic flowchart of a method for presenting a virtual reality picture according to an exemplary embodiment.

FIG. 10 is a schematic flowchart of a method for presenting a virtual reality picture according to an exemplary embodiment. The method may be executed by a virtual reality display device, for example, by a processor in the virtual reality display device, and for the structure of the virtual reality display device, reference may be made to the structure shown in FIG. 1, FIG. 3, or FIG. 6. As shown in FIG. 10, the method for presenting a virtual reality picture may include the following steps:

Step 1001: display a first image element of a virtual reality scene through a first display screen in the virtual reality display device.

In the embodiments of this disclosure, image elements in the virtual reality scene can be divided according to different depths of field and respectively displayed on different display screens in the virtual reality display device.

A main display screen in the virtual reality display device can display an image element with a fixed depth of field, for example, fixedly displaying an image element corresponding to a depth of field of a middle view scene.

Step 1002: display a second image element of the virtual reality scene through a second display screen in the virtual reality display device. Upon being zoomed by the zoom assembly and reflected by the semi-reflective lens in the virtual reality display device, the second image element is superimposed with the first image element to present a scene picture of the virtual reality scene.

In the embodiments of this disclosure, the secondary display screen displays image elements other than those displayed on the main display screen in a VR scene. For example, when the main display screen displays the image element of the middle view scene, the secondary display screen displays image elements including, but not limited to, a close view image element, a distant view image element, a middle view image element corresponding to a hole portion of the main display screen, and the like. Images respectively displayed on the main display screen and the secondary display screen are respectively transmitted and reflected by a beam splitting mirror and then superimposed into a complete scene picture of VR scene.

Step 1003: display, in response to a change in an eyeball focus position of a wearer of the virtual reality display device, the second image element that is updated, through the second display screen. Upon being zoomed by the zoom assembly and reflected by the semi-reflective lens, the second image element is superimposed with the first image element to present a scene picture of the virtual reality scene.

An imaging position of the second image element and respective definition of image sub-elements contained in the second image element are related to the eyeball focus position.

In an exemplary implementation, in response to a change of an eyeball focus position of a wearer of a virtual reality display device, a focal length of the zoom assembly is adjusted based on the changed eyeball focus position to change an imaging position of an image element displayed on the second display screen.

In the embodiments of this disclosure, the virtual reality display device detects and determines an eyeball focus position of the wearer through an eye tracking camera to determine the depth of field that the wearer is currently paying attention to. When the wearer's eyeball focus position (the depth of field position that the wearer pays attention to) changes, the virtual reality display device can correspondingly adjust the display effect of the second image element in the secondary display screen and adjust the focal length of the zoom assembly, so that an image element displayed on the secondary display screen can be imaged at the depth-of-field position that the wearer is currently concerned about after being reflected by the beam splitting mirror, and the image element at the depth-of-field position that the wearer is currently concerned about are displayed with better definition.

For example, taking the zoom assembly in the virtual reality display device having three focal lengths respectively corresponding to a close view, a middle view and a distant view as an example, the virtual reality display device can execute the following steps when displaying a virtual reality scene:

S1: Obtain a depth of field of each image element in the current virtual reality scene.

For example, the virtual reality display device can read the depth of field from attributes of each image element, or the virtual reality display device can also calculate a corresponding depth of field in real time according to a position of each image element in the virtual reality scene.

S2: Divide the image elements in the virtual reality scene into four categories, namely, a close view image element, a long view image element, middle view image element at a hole position of the main display screen, and a middle view image element at a non-hole position of the main display screen.

As the virtual reality scene changes, the distance between each image element in the virtual display scene and a virtual character corresponding to the user also changes accordingly, so the division of the above-mentioned four categories of image elements also changes accordingly.

S3: Display the middle view image element at the non-hole position of the main display screen in the main display screen, and display the close view image element, the distant view image element and the middle view image element at the hole position of the main display screen in the secondary display screen in a superimposed manner.

S4: Respectively adjust, according to the eyeball focus position of the wearer, the definition of the close view image element, the distant view image element and the middle view image element at the hole position of the main display screen that are displayed in the secondary display screen in a superimposed manner.

For example, when the eyeball focus position of the wearer is located at the close view position, the definition of the close view image element is improved, and the distant view image element and the middle view image element at the hole position of the main display screen are blurred. For another example, when the eyeball focus position of the wearer is located at the distant view position, the definition of the distant view image element is improved, and the close view image element and the middle view image element at the hole position of the main display screen are blurred.

S5: Adjust, according to the eyeball focus position of the wearer, the focal length of the zoom assembly so that the virtual image of the image element displayed in the secondary display screen is imaged at the eyeball focus position.

In an exemplary implementation, the adjusting, in response to the change in the eyeball focus position of the wearer of the virtual reality display device, a focal length of the zoom assembly based on the changed eyeball focus position includes:

obtaining, in response to the change in the eyeball focus position of the wearer of the virtual reality display device, a target on/off state of the liquid lens in the zoom assembly based on the changed eyeball focus position; and adjusting an on/off state of the liquid lens to the target on/off state to adjust the focal length of the zoom assembly.

In the embodiments of this disclosure, when the zoom assembly is composed of at least two liquid lenses, the virtual reality display device can determine the focal length of the zoom assembly according to a depth of field corresponding to the eyeball focus position of the wearer, and adjust the focal length of the zoom assembly by adjusting the on/off states of the at least two liquid lenses, so that an image element displayed on the secondary display screen is accurately imaged at the depth of field position where the eyeballs of the wearer are currently focused.

In an exemplary implementation, the method further includes: determining, in response to the change in the eyeball focus position of the wearer of the virtual reality display device, a target image sub-element in the second image element based on the changed eyeball focus position; and generating an updated second image element based on the target image sub-element of high definition and other blurred image sub-elements.

The other image sub-elements are image sub-elements in the second image element other than the target image sub-element.

Definition of the target image sub-element being higher than that of the other image sub-elements.

In the embodiments of this disclosure, the virtual reality display device can determine, according to the depth of field corresponding to the eyeball focus position of the wearer, an image element that needs to be displayed in high definition in the second display screen and an image element that needs to be blurred. That is, the virtual reality display device can display the image element at the depth of field position that the wearer is currently concerned about in high definition on the secondary display screen, so as to ensure good visual experience of the wearer, and blur the image elements of other depths of field to reduce the resource rendering effect during image display and improve the display performance.

In conclusion, according to the solutions shown in the embodiments of this disclosure, through a semi-reflective lens, a reflection displayed on the second display screen is superimposed onto a main optical axis in a bypass manner, light of at least two focal lengths emitted from the second display screen is zoomed by the zoom assembly. Image elements with different depths of field can be simultaneously displayed at different imaging positions based on the eyeball focus position of the user in combination with an image displayed on the first display screen. Moreover, at different moments, the imaging position of the image displayed on the second display screen can be changed with the eyeball focus position of the user, so that the simulation effect of the VR device on different stereoscopic image environments can be improved, thereby improving the VR display effect.

Figure 11:
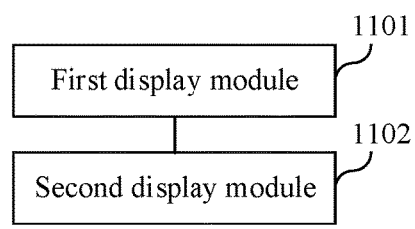
FIG. 11 is a structural block diagram of an apparatus for presenting a virtual reality picture according to an exemplary embodiment.

FIG. 11 is a structural block diagram of an apparatus for presenting a virtual reality picture according to an exemplary embodiment. The apparatus for presenting a virtual reality picture may be configured to perform some or all of the steps in the embodiment shown in FIG. 10. The apparatus for presenting a virtual reality picture includes:

a first display module 1101, configured to display a first image element of a virtual reality scene through a first display screen in the virtual reality display device, where for the structure of the virtual reality display device, reference may be made to the structure shown in FIG. 1, FIG. 3 or FIG. 6; and a second display module 1102, configured to display a second image element of the virtual reality scene through a second display screen in the virtual reality display device, upon being zoomed by the zoom assembly and reflected by the semi-reflective lens in the virtual reality display device, the second image element being superimposed with the first image element to present a scene picture of the virtual reality scene.

The second display module 1102 is further configured to display, in response to a change in an eyeball focus position of a wearer of the virtual reality display device, the second image element that is updated, through the second display screen. Upon being zoomed by the zoom assembly and reflected by the semi-reflective lens, the second image element is superimposed with the first image element to present a scene picture of the virtual reality scene.

An imaging position of the second image element and definition of image sub-elements contained in the second image element are related to the eyeball focus position.

In an exemplary implementation, the apparatus further includes:

a focal length adjusting module, configured to adjust, in response to the change in the eyeball focus position of the wearer of the virtual reality display device, a focal length of the zoom assembly based on the changed eyeball focus position, to change an imaging position of an image element displayed on the second display screen.

In an exemplary implementation, the zoom assembly includes a single liquid lens, or the zoom assembly includes at least two liquid lenses stacked together; and the focal length adjusting module is configured to:

obtain, in response to the change in the eyeball focus position of the wearer of the virtual reality display device, a target on/off state of the liquid lens in the zoom assembly based on the changed eyeball focus position; and adjust an on/off state of the liquid lens to the target on/off state to adjust the focal length of the zoom assembly.

In an exemplary implementation, the apparatus further includes:

a target element determining module, configured to determine, in response to the change in the eyeball focus position of the wearer of the virtual reality display device, a target image sub-element in the second image element based on the changed eyeball focus position; and an image element generating module, configured to generate the updated second image element based on the target image sub-element of high definition and other blurred image sub-elements.

The other image sub-elements are image sub-elements in the second image element other than the target image sub-element.

In conclusion, according to the solutions shown in the embodiments of this disclosure, through a semi-reflective lens, a reflection displayed on the second display screen is superimposed onto a main optical axis in a bypass manner, light of at least two focal lengths emitted from the second display screen is zoomed by the zoom assembly. Image elements with different depths of field can be simultaneously displayed at different imaging positions based on the eyeball focus position of the user in combination with an image displayed on the first display screen. Moreover, at different moments, the imaging position of the image displayed on the second display screen can be changed with the eyeball focus position of the user, so that the simulation effect of the VR device on different stereoscopic image environments can be improved, thereby improving the VR display effect.

Herein, the term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry (e.g., second acquiring circuitry, third acquiring circuitry, first sending circuitry, second sending circuitry, etc., which can be implemented on the same or different integrated circuit).

In an exemplary embodiment, a non-temporary computer-readable storage medium including an instruction, such as, a memory including a computer program (instruction), is further provided. The program (instruction) may be executed by a processor in a virtual reality display device to cause the virtual reality display device to perform the methods shown in the embodiments of this disclosure. For the structure of the virtual reality display device, reference may be made to the structure shown in FIG. 1, FIG. 3 or FIG. 6. For example, the non-transitory computer-readable storage medium may be a read-only memory (ROM), a random access memory (RAM), a compact disc read-only memory (CD-ROM), a magnetic tape, a floppy disk, an optical data storage device, or the like.

In an exemplary embodiment, a computer program product or a computer program is provided. The computer program product or the computer program includes a computer instruction, and the computer instruction is stored in a computer-readable storage medium. The processor of the virtual reality display device reads the computer instruction from the computer-readable storage medium and executes the computer instruction to cause the virtual reality display device to perform the methods shown in the foregoing embodiments of this disclosure. For the structure of the virtual reality display device, reference may be made to the structure shown in FIG. 1, FIG. 3 or FIG. 6.

What is claimed is:

1. A virtual reality display device, comprising: a main lens, a semi-reflective lens, a first display screen, a second display screen, a zoom assembly and an eye tracking camera,
wherein the main lens is arranged in front of the first display screen and perpendicular to a first direction; the first direction is a propagation direction of light emitted from the first display screen;
the semi-reflective lens is arranged between the main lens and the first display screen, and an inclination angle is formed between the semi-reflective lens and the first direction;
the eye tracking camera points to an eyeball position when the virtual reality display device being worn;
the second display screen faces the semi-reflective lens;
the zoom assembly is arranged on a front side of the second display screen, and light emitted from the second display screen passes through the zoom assembly, light passing through the zoom assembly is incident on the semi-reflective lens, reflected by the semi-reflective lens and then propagates along the first direction;
the zoom assembly has at least two focal lengths; and
the second display screen is configured to display an image based on an eyeball focus position detected by the eye tracking camera, and the zoom assembly is configured to adjust the focal length based on the eyeball focus position.

2. The virtual reality display device according to claim 1, wherein the zoom assembly is a liquid zoom assembly.

3. The virtual reality display device according to claim 2, wherein the zoom assembly comprises a single liquid lens.

4. The virtual reality display device according to claim 2, wherein the zoom assembly comprises at least two liquid lenses stacked together.

5. The virtual reality display device according to claim 1, wherein among the at least two focal lengths of the zoom assembly, every two adjacent focal lengths partially overlap each other.

6. The virtual reality display device according to claim 1, wherein the eye tracking camera is arranged in the first display screen.

7. The virtual reality display device according to claim 6, wherein the first display screen comprises a hole region, and the eye tracking camera is arranged in the hole region.

8. The virtual reality display device according to claim 7, wherein the second display and the hole region are arranged in a spatial relationship that prevents a user of the virtual reality display device from seeing the hole region.

9. The virtual reality display device according to claim 6, wherein the eye tracking camera is an under display camera of the first display screen.

10. The virtual reality display device according to claim 9, wherein the eye tracking camera is arranged at a screen center position of the first display screen.

11. The virtual reality display device according to claim 1, wherein the virtual reality display device further comprises a processor, and the processor is electrically connected to the first display screen, the second display screen, the zoom assembly and the eye tracking camera, respectively.

12. The virtual reality display device according to claim 1, wherein a target image sub-element in a second image element displayed on the second display screen is determined based on the eyeball focus position.

13. The virtual reality display device according to claim 12, wherein definition of the target image sub-element is higher than that of other image sub-elements in the second image element, the other image sub-elements are image sub-elements in the second image element other than the target image sub-element.

14. A method for presenting a virtual reality picture, comprising:
displaying a first image element of a virtual reality scene through a first display screen in a virtual reality display device;
displaying a second image element of the virtual reality scene through a second display screen in the virtual reality display device by zooming, with a zoom assembly in the virtual reality display device, light emitted from the second display screen and reflecting, with a semi-reflective lens in the virtual reality display device, the zoomed light, the second image element being superimposed with the first image element to present a scene picture of the virtual reality scene; and displaying, in response to a change in an eyeball focus position of a wearer of the virtual reality display device, the second image element that is updated, through the second display screen, wherein an imaging position of the second image element and definition of image sub-elements contained in the second image element are related to the eyeball focus position.

15. The method according to claim 14, further comprising:

adjusting, in response to the change in the eyeball focus position of the wearer of the virtual reality display device, a focal length of the zoom assembly based on the changed eyeball focus position, to change an imaging position of an image element displayed on the second display screen.

16. The method according to claim 15, wherein the zoom assembly comprises a single liquid lens, or the zoom assembly comprises at least two liquid lenses stacked together; and the adjusting the focal length of the zoom assembly based on the changed eyeball focus position comprises:

obtaining, in response to the change in the eyeball focus position of the wearer of the virtual reality display device, a target on/off state of the liquid lens based on the changed eyeball focus position; and adjusting an on/off state of the liquid lens to the target on/off state to adjust the focal length of the zoom assembly.

17. The method according to claim 14, further comprising:

determining, in response to the change in the eyeball focus position of the wearer of the virtual reality display device, a target image sub-element in the second image element based on the changed eyeball focus position; and generating an updated second image element based on the target image sub-element and other blurred image sub-elements, definition of the target image sub-element being higher than that of the other image sub-elements, wherein the other image sub-elements are image sub-elements in the second image element other than the target image sub-element.

18. An apparatus for presenting a virtual reality picture, comprising:

a memory operable to store computer-readable instructions; and a processor circuitry operable to read the computer-readable instructions, the processor circuitry when executing the computer-readable instructions is configured to:

display a first image element of a virtual reality scene through a first display screen in a virtual reality display device;

display a second image element of the virtual reality scene through a second display screen in the virtual reality display device by zooming, with a zoom assembly in the virtual reality display device, light emitted from the second display screen and reflecting, with a semi-reflective lens in the virtual reality display device, the zoomed light, the second image element being superimposed with the first image element to present a scene picture of the virtual reality scene; and display, in response to a change in an eyeball focus position of a wearer of the virtual reality display device, the second image element that is updated, through the second display screen, wherein an imaging position of the second image element and definition of image sub-elements contained in the second image element are related to the eyeball focus position.

19. The apparatus according to claim 18, the processor circuitry is further configured to:

adjust, in response to the change in the eyeball focus position of the wearer of the virtual reality display device, a focal length of the zoom assembly based on the changed eyeball focus position, to change an imaging position of an image element displayed on the second display screen.

20. The apparatus according to claim 19, wherein the zoom assembly comprises a single liquid lens, or the zoom assembly comprises at least two liquid lenses stacked together; and the processor circuitry is configured to:

obtain, in response to the change in the eyeball focus position of the wearer of the virtual reality display device, a target on/off state of the liquid lens based on the changed eyeball focus position; and adjust an on/off state of the liquid lens to the target on/off state to adjust the focal length of the zoom assembly.

* * * * *